June 13, 1961
F. KRAISSL, JR
2,988,009
EXTERNAL GEAR PUMP
Filed July 23, 1956
2 Sheets-Sheet 1
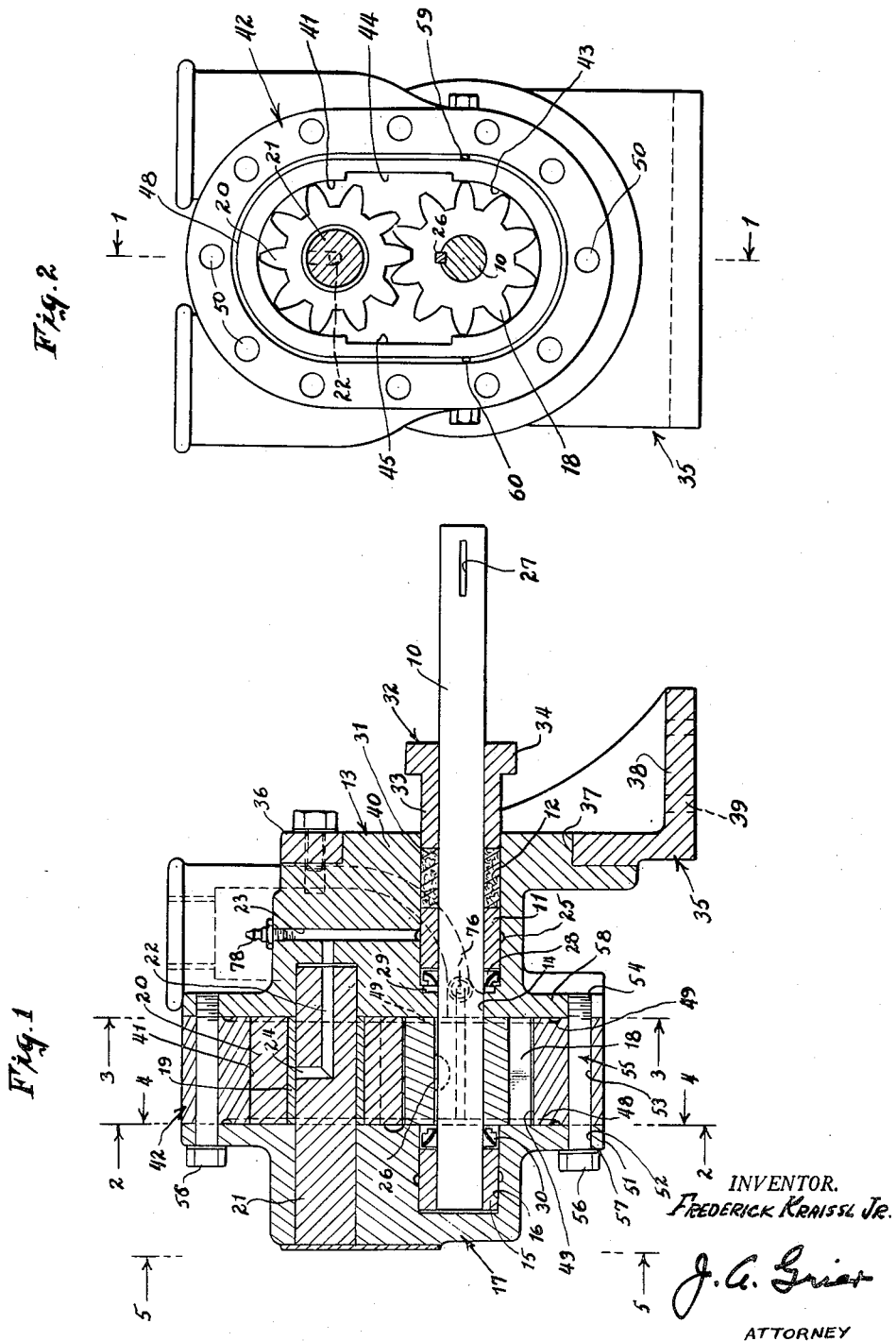
INVENTOR.
FREDERICK KRAISSL JR.
J. A. Grier
ATTORNEY June 13, 1961 F. KRAISSL, JR 2,988,009
EXTERNAL GEAR PUMP
Filed July 23, 1956 2 Sheets-Sheet 2
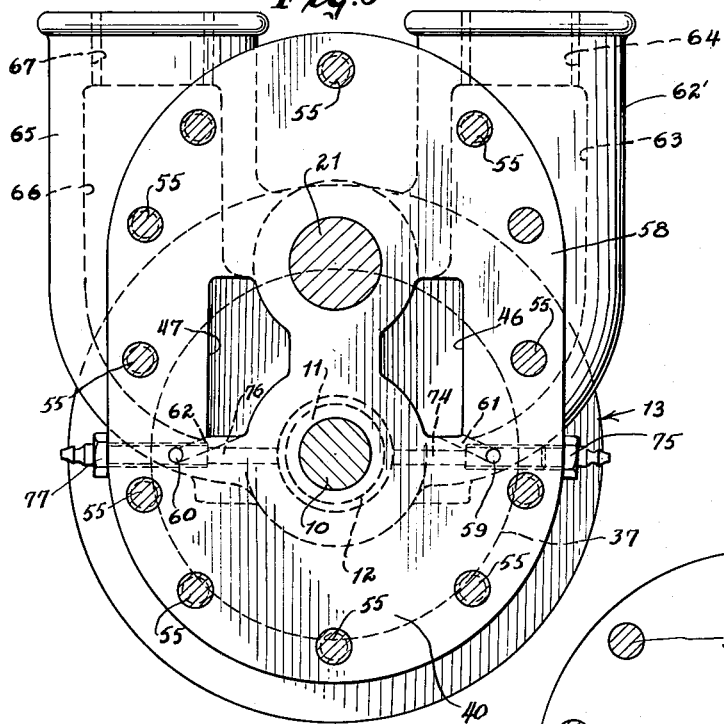
INVENTOR.
FREDERICK KRAISSL JR.
BY
J. G. Grier
ATTORNEY

United States Patent Office 2,988,009
Patented June 13, 1961

2,988,009
EXTERNAL GEAR PUMP
Frederick Kraissl, Jr., the Kraissl Co., 299 Williams Ave., North Hackensack, N.J.
Filed July 23, 1956, Ser. No. 599,487
2 Claims. (Cl. 103—126)

This invention relates to improvements in rotary pumps of the external gear type and has for a principal object the provision of a fixed shaft carried in the face plate and the end plate of said pump, and the second gear carrying its own bearing and operating as a true idler on said shaft.

Another object of the invention is the provision in a pump of the character described of an oval-shaped groove cast in the pump housing and providing a channel that functions as a leak preventer by connecting it to the return seal stuffing box which may be changed in the field by a simple adjustment when the suction and discharge ports are interchanged when the pump is to be run in the reverse direction.

Another object of the invention is the provision in a pump of a system of cast grooves and internal channels which function to prevent leaks at the junction of the face plate and the end plate and further function to vent the stuffing box to intake pressure and thereby minimizing leakage.

A further object of the invention is the provision in a pump of relief chambers which are so positioned at the root of the teeth of the gears that the dripping of oils which would otherwise build up excessive pressure between teeth is minimized and yet they permit high vacuum characteristics and they permit the interchange of suction and discharge ports by change of rotation.

Other objects and advantages of the invention will be apparent to those skilled in the art upon a study of this specification and the accompanying drawings.

Referring to the drawings which are given by way of example to illustrate the invention:

FIGURE 1 is a sectional elevation taken along the lines 1—1 of FIGURE 2.

FIGURE 2 is an elevation partly in section taken along the line 2—2 of FIGURE 1.

FIGURE 3 is an elevation partly in section taken along the line 3—3 of FIGURE 1.

FIGURE 4 is a view of the rear end plate as seen along the line 4—4 of FIGURE 1; and FIGURE 5 is a view of the end plate of FIGURE 4 as seen along the opposite face thereof or along the line 5—5 of FIGURE 1.

Referring first to FIGURES 1 and 2, the pump comprising a shaft 10 journaled in a bearing 11 positioned in a hole 12 formed in the end plate 13 and extends through a clearance hole 14 concentric with the hole 12 and thence into a bearing 15 which is carried in a hole 16 within the back end plate 17. Secured on the shaft 10 by means of a key 26, between the end plates 13 and 17, is a gear 18. The shaft 10 may also have a key-way 27 near its outer extremity.

Meshing with the gear 18 is a mating gear 20 which carries in a central hole therein a sleeve bearing 19. This sleeve bearing is journaled on a second shaft 21 which is mounted in aligned holes in the end plates 13 and 17 and which is fixed in the end plate 17 and thereby held against rotation. The shaft 21 has a central oil passage 22 which communicates with an oil passage 23 extending substantially vertical within the end plate 13 and with a substantially vertical oil passage 24 which extends radially in the shaft 21 to communicate with the interior of the sleeve 19. The oil passage 23 also communicates with an annular groove 25 within the hole 12, which groove surrounds the bearing 11 and supplies lubricant thereto. Between the clearance hole 14 and the bearing 11 is an annular seal 28 and a stepped hole 29. The annular seal functions to deflect extraneous and/or abrasive matter from the bearing and it also functions to bring lubricant into contact with lubricant impregnated bearing 11 to permit the renewal of the lubrication therein. Positioned in the hole 16 in addition to the bearing 15 is an annular seal 30 which also functions to prevent extraneous and/or abrasive matter from reaching the bearings and it also functions to bring lubricant in contact with the lubricant impregnated bearing 15 to permit the renewal of the lubricant.

Within the hole 12 is a packing gland 31 adapted to form a stuffing box and to effect a seal between the shaft and the wall of the hole 12 immediately surrounding the packing gland 31. A bushing 32 has a shank portion 33 which forms a working fit in the hole 12 and functions to press axially against the gland 31. The head or flange portion 34 may be somewhat oval in form and may have holes therethrough to accommodate threaded studs (not shown) mounted in the end plate 13 and urged axially by nuts engaging the threads on said studs. Stuffing boxes are old in the art and do not form any part of the present invention. A mounting foot 35 is comprised of a plate portion 36 having a hole 37 therethrough and having formed integral therewith a base portion 38 with mounting holes 39 therethrough. The end plate 13 has a boss portion 40 on which the hole 37 in the portion 36 forms a working fit. The stator 42 has an interior bore 41 providing the proper clearance for the gear 20 and it has a second bore 43 spaced apart from the first bore and providing the proper clearance for the gear 18. Between these bores are opposed notches 44 and 45 to provide suitable clearance therebetween and also to communicate with ports, such as the ports 46 and 47 respectively in the end plate 13, which will presently be described. About the bores and the notches is formed a groove 48, and on the opposite face of the stator 42 is formed a like groove 49. Grooves 48 and 49 are closed-loop grooves, such as oval or circular. Formed in the stator 42 is a series of through holes 50. In the present embodiment they are twelve in number, and bolts for holding the end plates and the stator together extend through clearance holes in the end plate 17 and engage threaded holes in the end plate 13, as will presently be described.

The holes in the end plates, FIGURES 1 and 2, and the stator are in aligned sets, and each set comprises a clearance hole in the flange 51 of the end plate 17, a clearance hole 53 in the stator 42, and a threaded hole in the flange portion 58 of the end plate 13. A bolt or cap screw 55, for each set of such holes, passes through all the clearance holes and the threads on said cap screw threadedly engages the hole 54 in the flange portion 58 of the end plate 13.

Twelve such cap screws hold the pump stator and the end plates together.

The grooves 48 and 49 in opposite faces of the stator are in communication with each other via holes 59 and 60 formed in the stator and extending axially therethrough.

Referring now to FIGURE 3, it will be noted that passages 61 and 62, formed in the end plate 13, communicate with the groove 49 and also communicate with the groove 48 via the holes 59 and 60 and the passage 61 also communicates with the port 46.

A tubular boss 62 is formed integral with the end plate 13 and has a passage 63 formed therein in communication with the port 45. The upper end of the passage 63 communicates with a threaded hole 64 in the hollow boss 62, which may be connected to a point of use.

In FIGURE 3, it will also be noted that a passage 62, formed in the end plate 13, communicates with the groove 49 and also communicates with the groove 48 via holes 59 and 60. The passageway 62 also communicates with the port 47.

A second tubular boss 65 is also formed integral with the end plate 13 and has a passage 66 formed therein in communication with the port 47. The upper end of the passage 66 also communicates with a threaded hole 67, in the tubular boss 65, which may be connected to a point of use.

The oval flange portion 58 of this end plate has already been described above as having 12 holes therein to accommodate bolts or cap screws 55, and how the stator and both end plates is sold as an entity.

FIGURE 4 is a view of the end plate 17, showing the face of the same which contacts the face of the stator along the line 4—4 in FIGURE 1. All of the cap screws 55 are shown in cross-section, and cross-sections of the shafts 10 and 21 are shown. Between these shafts and along a line where the gears 18 and 20 mesh are spaced relief chambers 68 and 69. These chambers are positioned in the end plate at the roots of the teeth of said gears so that the trapping of oils that would otherwise build up excessive pressures between the teeth is minimized, yet permitting high vacuum characteristics. Also, by changing the direction of rotation the suction and discharge ports are interchanged.

FIGURE 5 is an elevational view of the end plate as seen when looking at the left end of FIGURE 1. In the twelve holes in this end plate are the twelve cap screws 55 having heads 56 adjacent to the edge of the end plate. FIGURE 5 also shows a boss 70 into which one end of the shaft 21 is carried. Spaced apart from the boss 70 is a second boss 71, which carries the bearing 15 and an annular seal 30. The left end of the shaft 10 (as seen in FIGURE 1) is journaled in said bearing. An oil fitting 72 is mounted in the boss 71 so that lubricant may be supplied to the bearing 15, which may be an "oil-less" bushing, in which event the lubrication supplied renews the bushing to a state similar to its initial state.

The bosses 70 and 71 are formed integral with a bridging portion 73 which, in addition to joining said bosses, forms a pad for supporting a name plate.

Returning to FIGURE 3, the end plate 13 has a cross-passage 74 which extends from a point on the outer periphery of the oval flange portion 58 into the bore 12 and breaks through the hole 59, therefore it communicates with the port 46.

The end plate 13 also has a cross-passage 76 extending from a point on the periphery of the oval flange portion 58, opposite the first mentioned point on said periphery, and it communicates with the hole 60 on its way to the bore 12, and the "oil-less" bushing 11. This passage may carry an oil fitting 77, similar to the fittings 72, 75, 77, and 78. Oil under pressure may be fed via said fittings for replenishing oil to the "oil-less" bushing and substantially replenishing the oil in said bushings.

The grooves 48 and 49 and the holes 59 and 60 communicating with said grooves function to prevent leaks at the junction of the face plate and the end plate and venting the stuffing box to intake pressure, thereby minimizing leakage.

The groove formed in the housing provides a channel that functions as a leak preventer by connection to the return seal stuffing box with the provision for continuance of this functioning by a simple filled adjustment reversing said connections when the suction and discharge ports are interchanged and the rotation is reversed.

The seals 28 and 30 between the bearings and the pumping elements function to deflect extraneous and abrasive matter from the bearings and thereby to promote long life and trouble free service.

Although I have shown and described by way of example of the invention, it will be understood that I am not to be limited to the exact details herein shown and described, as many changes may be made in said arrangements within the scope of the appended claims.

I claim:

1. In a gear pump, a pump body having inlet and outlet ports, a shaft, end plates forming closures for said body, said shaft being journaled in bearings in said end plates, a gear fixed on said shaft within said body and movable therewith, a second shaft in said body fixed in spaced parallel relation to said first shaft, and a second gear having a bearing journaled on said second shaft and meshing with said first gear and functioning both as a true idler and a cooperative pumping element, the width of said gears being equal to the width of said body and the lateral faces of said gears being in the planes of the faces of said body, a closed loop groove at the contact areas of each of said end plates and said body, each of said grooves extending completely around said body between the inner and outer periphery thereof, at least one passage through said body from face to face, the open ends of said passage terminating in the respective grooves to provide communication between said grooves, whereby oil in said grooves is caused to flow to the interior of said pump and leakage of oil from said pump is minimized.

2. A gear pump according to claim 1 characterized in that said passage is parallel to the axes of said shafts.

References Cited in the file of this patent

UNITED STATES PATENTS

| 1,129,090 | Hawley | Feb. 23, 1915 |
| 1,597,411 | Kinney | Aug. 24, 1926 |
| 1,682,842 | Hamer | Sept. 4, 1928 |
| 1,976,227 | Howard | Oct. 9, 1934 |
| 2,053,783 | Ruesenberg | Sept. 8, 1936 |
| 2,076,664 | Nichols | Apr. 13, 1937 |
| 2,105,428 | Maglott | Jan. 11, 1938 |
| 2,310,078 | Herman | Feb. 2, 1943 |
| 2,395,824 | Herman | Mar. 5, 1946 |
| 2,491,100 | Frei | Dec. 13, 1949 |
| 2,518,338 | Lampe | Aug. 8, 1950 |
| 2,540,235 | Berkley | Feb. 7, 1951 |
| 2,704,232 | Johnston et al. | Mar. 15, 1955 |
| 2,714,856 | Kane | Aug. 9, 1955 |
| 2,772,638 | Nagely | Dec. 4, 1956 |
| 2,809,592 | Miller et al. | Oct. 15, 1957 |

FOREIGN PATENTS

| 578,809 | Great Britain | July 12, 1946 |